United States Patent
Jang

(10) Patent No.: US 12,058,343 B2
(45) Date of Patent: *Aug. 6, 2024

(54) IMAGE ENCODING/DECODING METHOD AND DEVICE FOR DETERMINING DIVISION MODE ON BASIS OF PREDICTION MODE TYPE DETERMINED ACCORDING TO COLOR FORMAT, AND METHOD FOR TRANSMITTING BITSTREAM

(71) Applicant: LG ELECTRONICS INC., Seoul (KR)

(72) Inventor: Hyeong Moon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 27 days.

This patent is subject to a terminal disclaimer.

(21) Appl. No.: 17/962,223

(22) Filed: Oct. 7, 2022

(65) Prior Publication Data
US 2023/0038610 A1 Feb. 9, 2023

Related U.S. Application Data

(63) Continuation of application No. 17/591,954, filed on Feb. 3, 2022, now Pat. No. 11,483,573, which is a
(Continued)

(51) Int. Cl.
*H04N 19/159* (2014.01)
*H04N 19/103* (2014.01)
(Continued)

(52) U.S. Cl.
CPC ......... *H04N 19/159* (2014.11); *H04N 19/103* (2014.11); *H04N 19/119* (2014.11);
(Continued)

(58) Field of Classification Search
CPC .. H04N 19/159; H04N 19/103; H04N 19/119; H04N 19/174; H04N 19/176;
(Continued)

(56) References Cited

U.S. PATENT DOCUMENTS

| | | | |
|---|---|---|---|
| 2012/0008683 A1* | 1/2012 | Karczewicz | H04N 19/46 375/E7.243 |
| 2015/0043639 A1* | 2/2015 | Lee | H04N 19/30 375/240.12 |
| 2016/0330480 A1* | 11/2016 | Liu | H04N 19/593 |

FOREIGN PATENT DOCUMENTS

| | | |
|---|---|---|
| KR | 20150067254 A | 6/2015 |
| KR | 20150135519 A | 12/2015 |

(Continued)

OTHER PUBLICATIONS

Benjamin Bross, et al. "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O2001.

*Primary Examiner* — Nam D Pham
(74) *Attorney, Agent, or Firm* — Bryan Cave Leighton Paisner LLP

(57) ABSTRACT

An image encoding/decoding method and apparatus are provided. An image decoding method performed by an image decoding apparatus may comprise obtaining a current block by splitting an image, determining prediction mode characteristic information based on encoding information of the current block, determining a prediction mode type of a lower-layer block split from the current block based on the prediction mode characteristic information, obtaining the lower-layer block by splitting the current block, and decoding the lower-layer block based on the determined prediction mode type of the lower-layer block. The prediction mode
(Continued)

characteristic information may be determined based on a color format of the current block.

14 Claims, 15 Drawing Sheets

Related U.S. Application Data continuation of application No. PCT/KR2020/010444, filed on Aug. 6, 2020.

(60) Provisional application No. 62/883,130, filed on Aug. 6, 2019.

(51) Int. Cl.
*H04N 19/119* (2014.01)
*H04N 19/174* (2014.01)
*H04N 19/176* (2014.01)
*H04N 19/186* (2014.01)
*H04N 19/503* (2014.01)
*H04N 19/593* (2014.01)
*H04N 19/96* (2014.01)

(52) U.S. Cl.
CPC ......... *H04N 19/174* (2014.11); *H04N 19/176* (2014.11); *H04N 19/186* (2014.11); *H04N 19/503* (2014.11); *H04N 19/593* (2014.11); *H04N 19/96* (2014.11)

(58) Field of Classification Search
CPC .. H04N 19/186; H04N 19/503; H04N 19/593; H04N 19/96
See application file for complete search history.

(56) References Cited

FOREIGN PATENT DOCUMENTS

| KR | 20160126096 A | 11/2016 |
|---|---|---|
| KR | 20170135886 A | 12/2017 |

* cited by examiner

FIG. 4
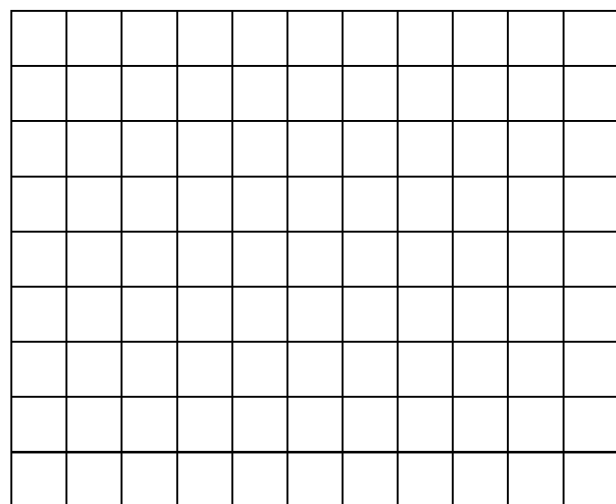
FIG. 5
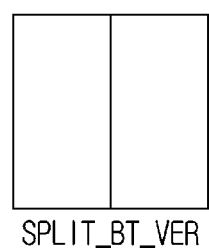 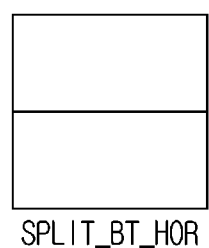 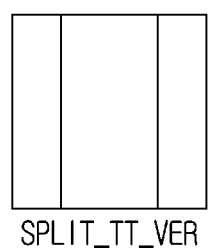 
SPLIT_BT_VER     SPLIT_BT_HOR     SPLIT_TT_VER     SPLIT_TT_HOR × : Location of luma sample
○ : Location of chroma sample × : Location of luma sample
○ : Location of chroma sample × : Location of luma sample
○ : Location of chroma sample

| seq_parameter_set_rbsp( ) { | Descriptor |
|---|---|
| sps_decoding_parameter_set_id | u(4) |
| sps_video_parameter_set_id | u(4) |
| sps_max_sublayers_minus1 | u(3) |
| sps_reserved_zero_5bits | u(5) |
| profile_tier_level(sps_max_sub_layers_minus1 ) | |
| gra_enabled_flag | u(1) |
| sps_seq_parameter_set_id | ue(v) |
| chroma_format_idc | ue(v) |
| if(chroma_format_idc == 3 ) | |
|    separate_colour_plane_flag | u(1) |
| ... | ... |

| chroma_format_idc | separate_colour_plane_flag | ChromaArrayType | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

FIG. 15

| | | Descriptor |
|---|---|---|
| 1510 | coding_tree( x0, y0, cbWidth, cbHeight, qgOnY, qgOnC, cbSubdiv, cqtDepth, mttDepth, depthOffset, partIdx, treeTypeCurr, modeTypeCurr ) { | |
| | if( ( allowSplitBtVer \|\| allowSplitBtHor \| allowSplitTtVer \|\| allowSplitTtHor \|\| allowSplitQT ) &&( x0 + cbWidth <= pic_width_in_luma_samples ) && (y0 + cbHeight <= pic_height_in_luma_samples ) ) | |
| | split_cu_flag | ae(v) |
| | if( cu_qp_delta_enabled_flag && qgOnY && cbSubdiv <= cu_qp_delta_subdiv ) { | |
| | IsCuQpDeltaCoded = 0 | |
| | CuQpDeltaVal = 0 | |
| | CuQgTopLeftX = x0 | |
| | CuQgTopLeftY = y0 | |
| | } | |
| | if( cu_chroma_qp_offset_enabled_flag && qgOnC && cbSubdiv <= cu_chroma_qp_offset_subdiv ) | |
| | IsCuChromaQpOffsetCoded = 0 | |
| | if( split_cu_flag ) { | |
| | if( ( allowSplitBtVer \|\| allowSplitBtHor \|\| allowSplitTtVer \|\| allowSplitTtHor ) && allowSplitQT ) | |
| | split_qt_flag | ae(v) |
| | if( !split_qt_flag ) { | |
| | if( ( allowSplitBtHor \|\| allowSplitTtHor ) && ( allowSplitBtVer \|\| allowSplitTtVer ) ) | |
| | mtt_split_cu_vertical_flag | ae(v) |
| | if( ( allowSplitBtVer && allowSplitTtVer && mtt_split_cu_vertical_flag ) \|\| ( allowSplitBtHor && allowSplitTtHor && !mtt_split_cu_vertical_flag ) ) | |
| | mtt_split_cu_binary_flag | ae(v) |
| | } | |
| 1520 | if( modeTypeCondition == 1 ) | |
| 1530 | modeType = MODE_TYPE_INTRA | |
| 1540 | else if( modeTypeCondition == 2 ) { | |
| 1550 | mode_constraint_flag | ae(v) |
| 1560 | modeType = mode_constraint_flag ? MODE_TYPE_INTRA : MODE_TYPE_INTER | |
| | } else { | |
| 1570 | modeType = modeTypeCurr | |
| | } | |
| 1580 | treeType = ( modeType == MODE_TYPE_INTRA ) ? DUAL_TREE_LUMA : treeTypeCurr | |

FIG. 16

```
if( !split_qt_flag ) {
    if( MttSplitMode[ x0 ][ y0 ][ mttDepth ] == SPLIT_BT_VER ) {
        depthOffset += ( x0 + cbWidth > pic_width_in_luma_samples ) ? 1 : 0
        x1 = x0 + ( cbWidth / 2 )
        coding_tree( x0, y0, cbWidth / 2, cbHeight, qgOnY, qgOnC, cbSubdiv + 1,
                     cqtDepth, mttDepth + 1, depthOffset, 0, treeType, modeType )
        if( x1 < pic_width_in_luma_samples )
            coding_tree( x1, y0, cbWidth / 2, cbHeightY, qgOnY, qgOnC, cbSubdiv + 1,
                         cqtDepth, mttDepth + 1, depthOffset, 1, treeType, modeType )
    } else if( MttSplitMode[ x0 ][ y0 ][ mttDepth ] == SPLIT_BT_HOR ) {
        depthOffset += ( y0 + cbHeight > pic_height_in_luma_samples ) ? 1 : 0
        y1 = y0 + ( cbHeight / 2 )
        coding_tree( x0, y0, cbWidth, cbHeight / 2, qgOnY, qgOnC, cbSubdiv + 1,
                     cqtDepth, mttDepth + 1, depthOffset, 0, treeType, modeType )
        if( y1 < pic_height_in_luma_samples )
            coding_tree( x0, y1, cbWidth, cbHeight / 2, qgOnY, qgOnC, cbSubdiv + 1,
                         cqtDepth, mttDepth + 1, depthOffset, 1, treeType, modeType )
    } else if( MttSplitMode[ x0 ][ y0 ][ mttDepth ] == SPLIT_TT_VER ) {
        x1 = x0 + ( cbWidth / 4 )
        x2 = x0 + ( 3 * cbWidth / 4 )
        qgOnY = qgOnY && ( cbSubdiv + 2 <= cu_qp_delta_subdiv )
        qgOnC = qgOnC && ( cbSubdiv - 2 <= cu_chroma_qp_offset_subdiv )
        coding_tree( x0, y0, cbWidth / 4, cbHeight, qgOnY, qgOnC, cbSubdiv + 2,
                     cqtDepth, mttDepth + 1, depthOffset, 0, treeType, modeType )
        coding_tree( x1, y0, cbWidth / 2, cbHeight, qgOnY, qgOnC, cbSubdiv + 1,
                     cqtDepth, mttDepth + 1, depthOffset, 1, treeType, modeType )
        coding_tree( x2, y0, cbWidth / 4, cbHeight, qgOnY, qgOnC, cbSubdiv + 2,
                     cqtDepth, mttDepth + 1, depthOffset, 2, treeType, modeType )
    } else { /* SPLIT_TT_HOR */
        y1 = y0 + ( cbHeight / 4 )
        y2 = y0 + ( 3 * cbHeight / 4 )
        qgOnY = qgOnY && ( cbSubdiv + 2 <= cu_qp_delta_subdiv )
        qgOnC = qgOnC && ( cbSubdiv - 2 <= cu_chroma_qp_offset_subdiv )
        coding_tree( x0, y0, cbWidth, cbHeight / 4, qgOnY, qgOnC, cbSubdiv + 2,
                     cqtDepth, mttDepth + 1, depthOffset, 0, treeType, modeType )
        coding_tree( x0, y1, cbWidth, cbHeight / 2, qgOnY, qgOnC, cbSubdiv + 1,
                     cqtDepth, mttDepth + 1, depthOffset, 1, treeType, modeType )
        coding_tree( x0, y2, cbWidth, cbHeight / 4, qgOnY, qgOnC, cbSubdiv + 2,
                     cqtDepth, mttDepth + 1, depthOffset, 2, treeType, modeType )
    }
```

```
        } else {
            x1 = x0 + ( cbWidth / 2 )
            y1 = y0 + ( cbHeight / 2 )
            coding_tree( x0, y0, cbWidth / 2, cbHeight / 2, qgOnY, qgOnC, cbSubdiv + 2,
                         cqtDepth + 1, 0, 0, 0, treeType, modeType )
            if( x1 < pic_width_in_luma_samples )
1710 {          coding_tree( x1, y0, cbWidth / 2, cbHeight / 2, qgOnY, qgOnC, cbSubdiv + 2,
                         cqtDepth + 1, 0, 0, 1, treeType, modeType )
            if( y1 < pic_height_in_luma_samples )
                coding_tree( x0, y1, cbWidth / 2, cbHeight / 2, qgOnY, qgOnC, cbSubdiv + 2,
                         cqtDepth + 1, 0, 0, 2, treeType, modeType )
            if( y1 < pic_height_in_luma_samples && x1 < pic_width_in_luma_samples )
                coding_tree( x1, y1, cbWidth / 2, cbHeight / 2, qgOnY, qgOnC, cbSubdiv + 2,
                         cqtDepth + 1, 0, 0, 3, treeType, modeType )
        }
1720─  if( modeTypeCur = = MODE_TYPE_ALL && modeType = = MODE_TYPE_INTRA ) {
1730─      coding_tree( x0, y0, cbWidth, cbHeight, qgOnY, qgOnC, cbSubdiv, cqtDepth, mttDepth, 0, 0
                     DUAL_TREE_CHROMA, modeType )
        }
    } else
        coding_unit( x0, y0, cbWidth, cbHeight, cqtDepth, treeTypeCurr, modeTypeCurr )
}
```

FIG. 18

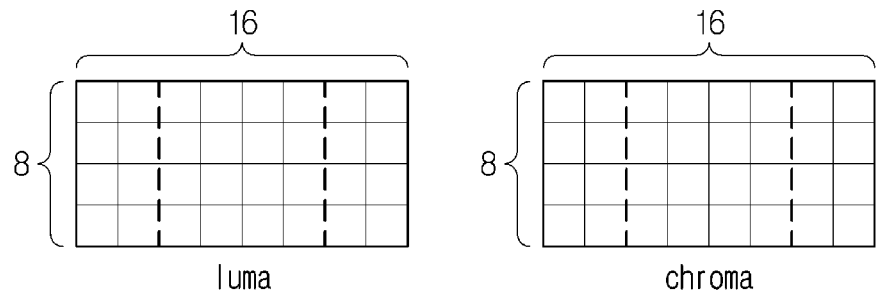

luma          chroma

IMAGE ENCODING/DECODING METHOD AND DEVICE FOR DETERMINING DIVISION MODE ON BASIS OF PREDICTION MODE TYPE DETERMINED ACCORDING TO COLOR FORMAT, AND METHOD FOR TRANSMITTING BITSTREAM

This application is a Continuation Application of U.S. patent application Ser. No. 17/591,954, filed on Feb. 3, 2022, which is the Continuation Bypass of International Application No. PCT/KR2020/010444, filed on Aug. 6, 2020, which claims the benefit of U.S. Provisional Application No. 62/883,130, filed on Aug. 6, 2019, and the contents of which are all hereby incorporated by reference herein in their entirety.

TECHNICAL FIELD

The present disclosure relates to an image encoding/decoding method and apparatus, and, more particularly, to an image encoding/decoding method for determining a splitting mode according to a color format, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost. [3] Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

An object of the present disclosure is to provide an image encoding/decoding method and apparatus for improving encoding/decoding efficiency by determining a splitting mode according to a color format.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining a current block by splitting an image, determining prediction mode characteristic information based on encoding information of the current block, determining a prediction mode type of a lower-layer block split from the current block based on the prediction mode characteristic information, obtaining the lower-layer block by splitting the current block, and decoding the lower-layer block based on the determined prediction mode type of the lower-layer block. The prediction mode characteristic information may be determined based on a color format of the current block.

In addition, the obtaining the lower-layer block by splitting the current block may be performed by determining a splitting structure of the lower-layer block based on the prediction mode type of the lower-layer block, and the splitting structure of the lower-layer block may be determined to be a dual tree splitting structure, based on the prediction mode type of the lower-layer block being an intra prediction mode type.

In addition, splitting availability of a luma block and a chroma block for the current block may be independently determined, based on the splitting structure of the lower-layer block being determined to be the dual tree splitting structure, and the splitting availability of the chroma block may be determined based on the color format. For example, the prediction mode characteristic information may be determined to be a first value, based on the color format of the current block being a monochrome format or a 4:4:4 format. The prediction mode type of the lower-layer block may be determined to be a prediction mode type of the current block, based on the prediction mode characteristic information being a first value.

For example, the prediction mode characteristic information may be determined to be a first value, based on the number of luma samples of the current block being 64, the splitting mode of the current block being a binary splitting mode and the color format of the current block being a predetermined format. Alternatively, the prediction mode characteristic information may be determined to be a first value, based on the number of luma samples of the current block being 128, the splitting mode of the current block being a ternary splitting mode and the color format of the current block being a predetermined format. The predetermined format may be a monochrome format or a 4:4:4 format.

Alternatively, the prediction mode characteristic information may be determined depending on whether a slice to which the current block belongs is an I slice, based on the color format of the current block being a 4:2:0 format, the number of luma samples of the current block being 64 and the splitting mode of the current block being a binary splitting mode.

Alternatively, the prediction mode characteristic information may be determined depending on whether a slice to which the current block belongs is an I slice, based on the color format of the current block being a 4:2:0 format, the number of luma samples of the current block being 128 and the splitting mode of the current block being a ternary splitting mode.

In addition, the prediction mode characteristic information may be determined to be a second value, based on the slice to which the current block belongs being an I slice, and the prediction mode type of the lower-layer block may be determined to be an intra prediction mode type, based on the prediction mode characteristic information being the second value.

Meanwhile, the prediction mode characteristic information may be determined to be a third value, based on the slice to which the current block belongs being not an I slice, the prediction mode type of the lower-layer block may be determined based on mode constraint information obtained from a bitstream, based on the prediction mode characteristic information being the third value. The mode constraint information may specify whether an inter prediction mode is allowed, and the prediction mode type of the lower-layer block may be determined to be an inter prediction mode type, based on the mode constraint information specifying that the inter prediction mode is allowed.

In addition, an image decoding apparatus according to an aspect of the present disclosure may comprise a memory and at least one processor. The at least one processor may obtain a current block by splitting an image, determine prediction mode characteristic information based on encoding information of the current block, determine a prediction mode type of a lower-layer block split from the current block based on the prediction mode characteristic information, obtain the lower-layer block by splitting the current block, and decode the lower-layer block based on the determined prediction mode type of the lower-layer block. The prediction mode characteristic information may be determined based on a color format of the current block.

In addition, an image encoding method performed by an image encoding apparatus according to an aspect of the present disclosure may comprise obtaining a current block by splitting an image, determining prediction mode characteristic information based on encoding information of the current block, determining a prediction mode type of a lower-layer block split from the current block based on the prediction mode characteristic information, obtaining the lower-layer block by splitting the current block, and encoding the lower-layer block based on the determined prediction mode type of the lower-layer block. The prediction mode characteristic information may be determined based on a color format of the current block.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by determining a splitting mode according to a color format.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIGS. 15 to 17 are views illustrating one syntax for a coding tree unit (CTU) according to an embodiment.

FIG. 18 is a view illustrating a luma block and a chroma block when a color format is 4:4:4.

MODE FOR INVENTION

Figure 1:
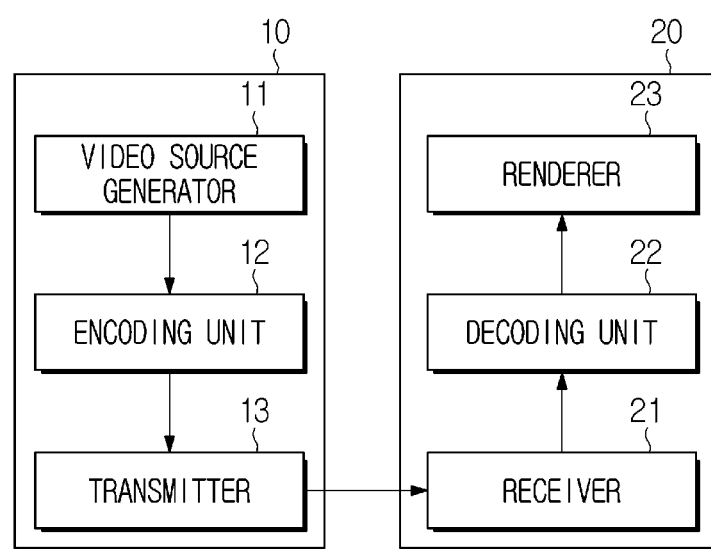
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
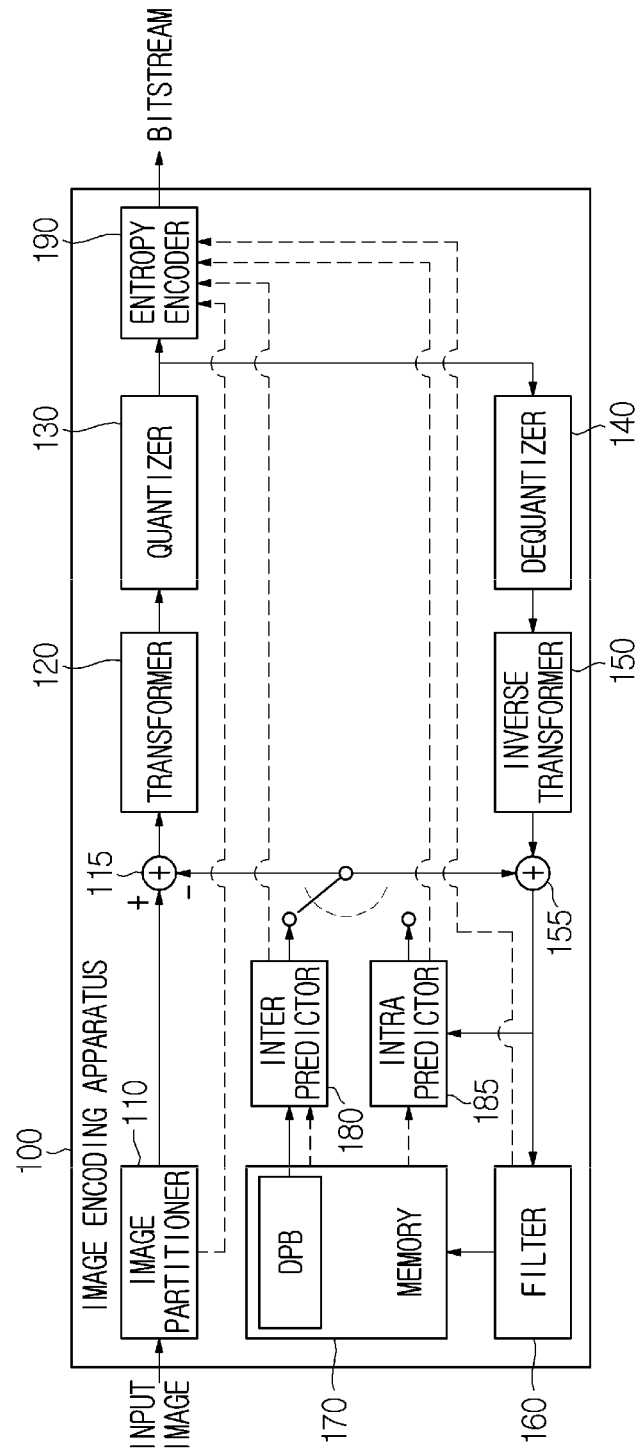
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
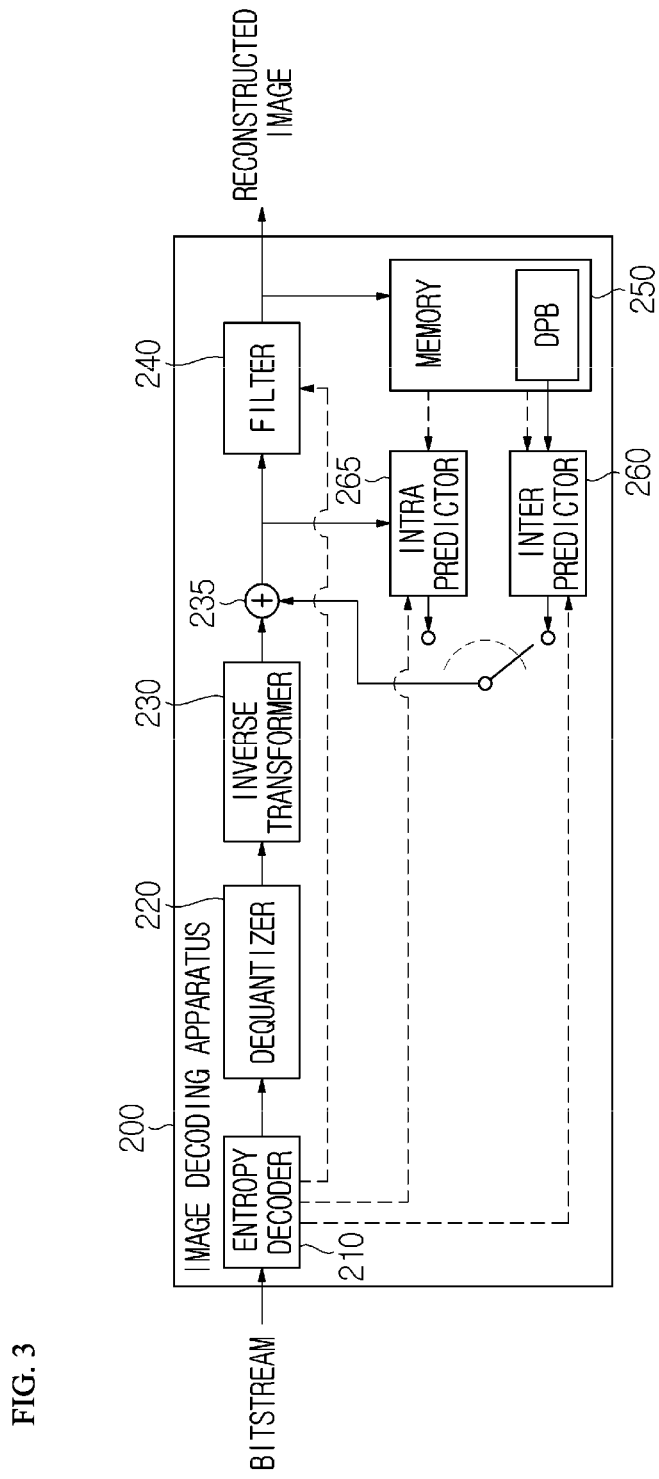
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure.

Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
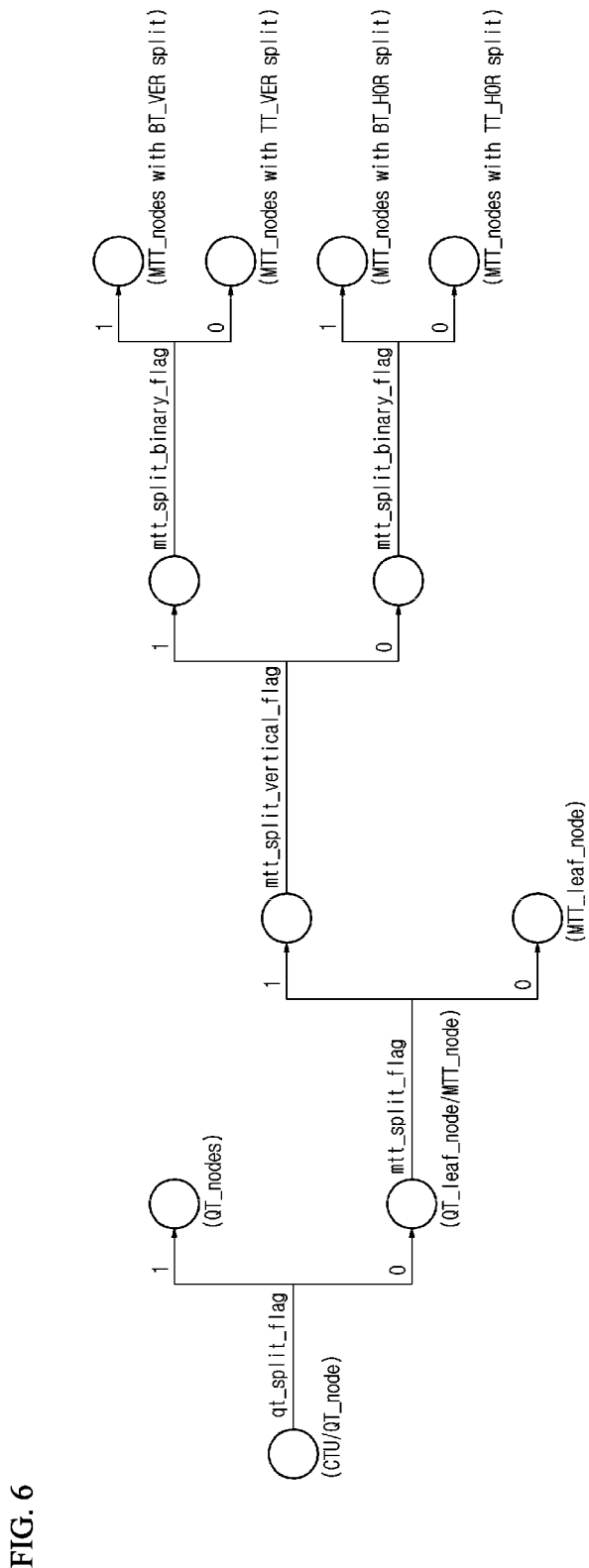
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the splitting type is a binary splitting type or a ternary splitting type. For example, the splitting type may be a binary splitting type when the third flag is 1 and may be a ternary splitting type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
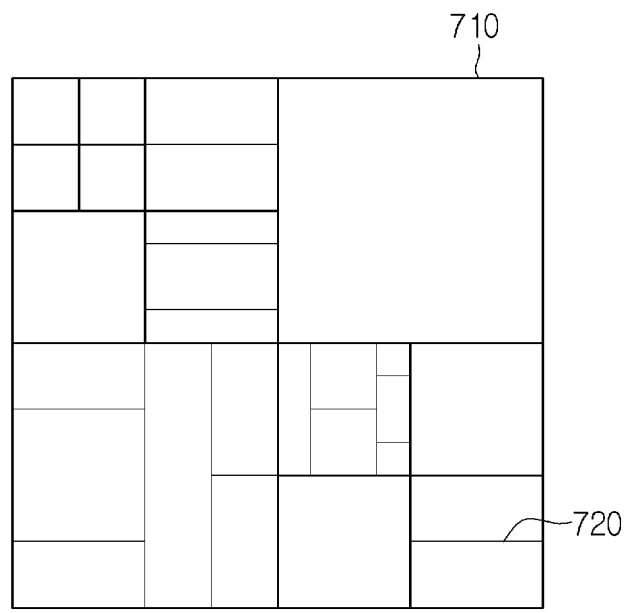
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMTtDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtszie may be set to 64×64, MinBtSize and MinTtSize may be set to 4×4, and MaxMTtDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 8:
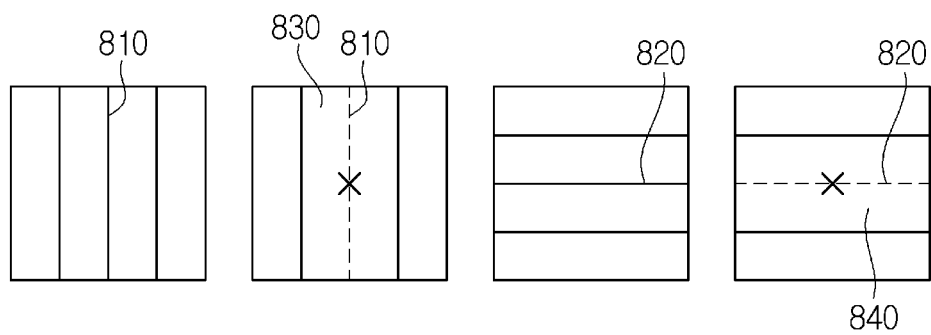
FIG. 8 is a view illustrating an embodiment of a redundant splitting pattern.

For example, FIG. 8 shows redundant splitting patterns which may occur in binary tree splitting and ternary tree splitting. As shown in FIG. 8, continuous binary splitting 810 and 820 for one direction of two-step levels have the same coding block structure as binary splitting for a center partition after ternary splitting. In this case, binary tree splitting for center blocks 830 and 840 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 8, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Overview of Chroma Format

Hereinafter, a chroma format will be described. An image may be encoded into encoded data including a luma component (e.g., Y) array and two chroma component (e.g., Cb and Cr) arrays. For example, one pixel of the encoded image may include a luma sample and a chroma sample. A chroma format may be used to represent a configuration format of the luma sample and the chroma sample, and the chroma format may be referred to as a color format.

In an embodiment, an image may be encoded into various chroma formats such as monochrome, 4:2:0, 4:2:2 or 4:4:4. In monochrome sampling, there may be one sample array and the sample array may be a luma array. In 4:2:0 sampling, there may be one luma sample array and two chroma sample arrays, each of the two chroma arrays may have a height equal to half that of the luma array and a width equal to half that of the luma array. In 4:2:2 sampling, there may be one luma sample array and two chroma sample arrays, each of the two chroma arrays may have a height equal to that of the luma array and a width equal to half that of the luma array. In 4:4:4 sampling, there may be one luma sample array and two chroma sample arrays, and each of the two chroma arrays may have a height and width equal to those of the luma array.

Figure 9:
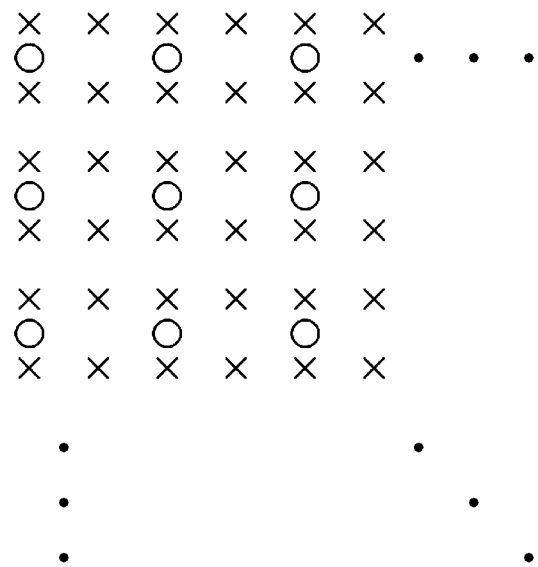
FIGS. 9 to 11 are views illustrating a positional relationship between a luma sample and a chroma sample determined according to a chroma format according to an embodiment.
Figure 10:
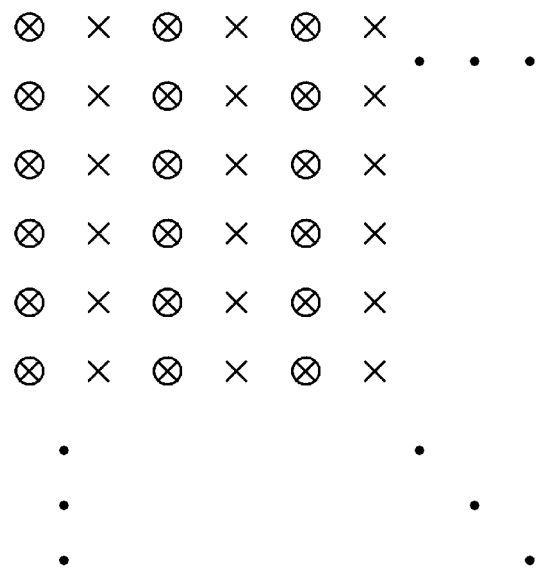
Figures 11, 12:
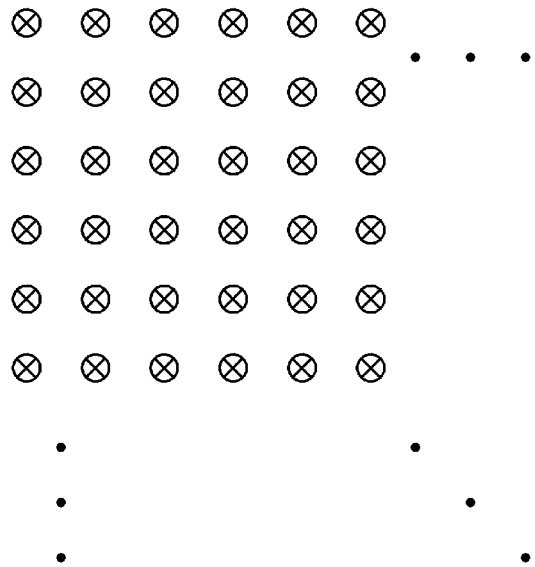
FIG. 12 is a view illustrating a syntax for chroma format signaling according to an embodiment.

FIG. 9 is a view illustrating a relative position according to an embodiment of a luma sample and a chroma sample according to 4:2:0 sampling. FIG. 10 is a view illustrating a relative position according to an embodiment of a luma sample and a chroma sample according to 4:2:2 sampling. FIG. 11 is a view illustrating a relative position according to an embodiment of a luma sample and a chroma sample according to 4:4:4 sampling. As shown in FIG. 9, in 4:2:0 sampling, a chroma sample may be located below a luma sample corresponding thereto. As shown in FIG. 10, in 4:2:2 sampling, a chroma sample may be located to overlap a luma sample corresponding thereto. As shown in FIG. 11, in 4:4:4 sampling, both a luma sample and a chroma sample may be located at an overlapping position.

A chroma format used in an encoding apparatus and a decoding apparatus may be predetermined. Alternatively, a chroma format may be signaled from an encoding apparatus to a decoding apparatus to be adaptively used in the encoding apparatus and the decoding apparatus. In an embodiment, the chroma format may be signaled based on at least one of chroma_format_idc or separate_colour_plane_flag. At least one of chroma_format_idc or separate_colour_plane_flag may be signaled through higher level syntax such as DPS, VPS, SPS or PPS. For example, chroma_format_idc and separate_colour_plane_flag may be included in SPS syntax shown in FIG. 12.

Figures 13, 14:
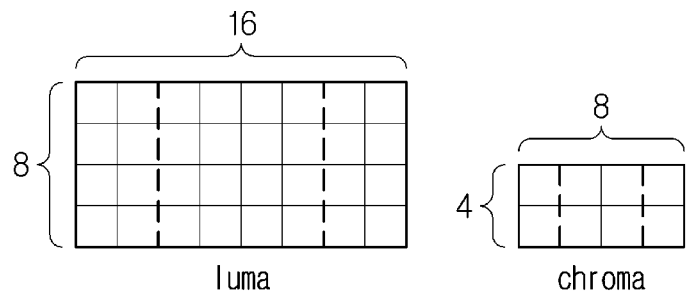
FIG. 13 is a view illustrating a chroma format classification table according to an embodiment.
FIG. 14 is a view illustrating an embodiment of a luma block and a chroma block when a color format is 4:2:0.

Meanwhile, FIG. 13 shows an embodiment of chroma format classification using signaling of chroma_format_idc and separate_colour_plane_flag. chroma_format_idc may be information specifying a chroma format applying to an encoded image. separate_colour_plane_flag may specify whether a color array is separately processed in a specific chroma format. For example, a first value (e.g., 0) of chroma_format_idc may specify monochrome sampling. A second value (e.g., 1) of chroma_format_idc may specify 4:2:0 sampling. A third value (e.g., 2) of chroma_format_idc may specify 4:2:2 sampling. A fourth value (e.g., 3) of chroma_format_idc may specify 4:4:4 sampling.

In 4:4:4, the following may apply based on the value of separate_colour_plane_flag. If the value of separate_colour_plane_flag is a first value (e.g., 0), each of two chroma arrays may have the same height and width as a luma array. In this case, a value of ChromaArrayType specifying a type of a chroma sample array may be set equal to chroma_format_idc. If the value of separate_colour_plane_flag is a second value (e.g., 1), luma, Cb and Cr sample arrays may be separately processed and processed along with monochrome-sampled pictures. In this case, ChromaArrayType may be set to 0.

Intra Prediction on Chroma Block

When intra prediction is performed on a current block, prediction on a luma component block (luma block) of the current block and prediction on a chroma component block (chroma block) may be performed. In this case, the intra prediction mode for the chroma block may be set separately from the intra prediction mode for the luma block.

For example, the intra prediction mode for the chroma block may be specified based on intra chroma prediction mode information, and the intra chroma prediction mode information may be signaled in the form of an intra_chroma_pred_mode syntax element. For example, the intra chroma prediction mode information may represent one of a planar mode, a DC mode, a vertical mode, a horizontal mode, a derived mode (DM), and a cross-component linear model (CCLM) mode. Here, the planar mode may specify intra prediction mode #0, the DC mode may specify intra prediction mode #1, the vertical mode may specify intra prediction mode #26, and the horizontal mode may specify intra prediction mode #10. DM may also be referred to as a direct mode. The CCLM may also be referred to as a linear model (LM). The CCLM mode may include at least one of L_CCLM, T_CCLM and LT_CCLM.

Meanwhile, the DM and the CCLM are dependent intra prediction modes for predicting the chroma block using information on the luma block. The DM may represent a mode in which the same intra prediction mode as the intra prediction mode for the luma component applies as the intra prediction mode for the chroma component. In addition, the CCLM may represent an intra prediction mode using, as the prediction samples of the chroma block, samples derived by subsampling reconstructed samples of the luma block and then applying α and β which are CCLM parameters to subsampled samples in a process of generating the prediction block for the chroma block.

CCLM (Cross-Component Linear Model) Mode

As described above, a CCLM mode may apply to a chroma block. The CCLM mode is an intra prediction mode using correlation between a luma block and a chroma block corresponding to the luma block, and is performed by deriving a linear model based on neighboring samples of the luma block and neighboring samples of the chroma block. In addition, a prediction sample of the chroma block may be derived based on the derived linear model and the reconstructed samples of the luma block.

Specifically, when the CCLM mode applies to a current chroma block, parameters for a linear model may be derived based on neighboring samples used for intra prediction of the current chroma block and neighboring samples used for intra prediction of a current luma block. For example, the linear model for CCLM may be expressed based on the following equation.

[Equation 1]

$$pred_c(i,j) = \alpha \cdot rec_L'(i,j) + \beta$$

where, $pred_c(i,j)$ may denote the prediction sample of (i, j) coordinates of the current chroma block in the current CU. $rec_L'(i,j)$ may denote the reconstructed sample of (i, j) coordinates of the current luma block in the CU. For example, $rec_L'(i,j)$ may denote the down-sampled reconstructed sample of the current luma block. Linear model coefficients α and β may be signaled or derived from neighboring samples.

Minimum Size Limitation of Chroma Block

If a chroma block having a very small size is frequently generated in a process of encoding and decoding a high-resolution image such as VVC, encoding and decoding processing throughput may deteriorate. In order to improve throughput, splitting of a CU may be limited such that a chroma block having a certain size is not generated.

In an embodiment, in order to limit generation of a chroma block having a certain size, a minimum size of the chroma block may be set. In an embodiment, an encoding apparatus and a decoding apparatus may limit the size of the chroma block such that the chroma block includes at least 16 chroma samples. For example, splitting of a luma block or a chroma block may be limited such that a chroma block having a chroma sample size of 2×2, 2×4 or 4×2 is not generated in an encoding and decoding process.

For example, in order to prevent a chroma block having a size of 2×2, 2×4 or 4×2 (e.g., a chroma sample unit) from being generated, in the case of a dual tree splitting structure, quad tree splitting or binary tree splitting of a chroma block having a size of 2×8, 4×4 or 8×2 may be prohibited, and ternary splitting of a chroma block having a size of 2×8, 2×16, 4×4, 4×8, 8×2 or 8×4 may be prohibited.

More specifically, when any one of the following conditions is satisfied, quad tree splitting for a current block may be limited.

(Condition 1-1) the splitting structure of the current block is single tree or dual tree luma and the size of the luma block is a minimum size capable of quad tree splitting (Condition 1-2) the splitting structure of the current block is dual tree chroma and the size of the chroma block is a minimum size capable of quad tree splitting (Condition 1-3) the splitting structure of the current block is dual tree chroma and the size of the chroma block is less than 4

(Condition 1-4) the splitting structure of the current block is dual tree chroma and the prediction mode of the current block is MODE_TYPE_INTRA Alternatively, when any one of the following conditions is satisfied, binary tree splitting for the current block may be limited.

(Condition 2-1) the splitting structure of the current block is dual tree chroma and a product of the width and height of the current block is equal to or less than 16 (for example, the number of chroma samples belonging to the current block is equal to or less than 16)

(Condition 2-2) the splitting structure of the current block is dual tree chroma and the prediction mode of the current block is MODE_TYPE_INTRA Alternatively, when any one of the following conditions is satisfied, ternary tree splitting for the current block may be limited.

(Condition 3-1) the splitting structure of the current block is dual tree chroma and a product of the width and height of the current block is equal to or less than 32 (for example, the number of chroma samples belonging to the current block is equal to or less than 32)

(Condition 3-2) the splitting structure of the current block is dual tree chroma and the prediction mode of the current block is MODE_TYPE_INTRA Transition from Single Tree Splitting Structure to Dual Tree Splitting Structure Meanwhile, in the case of a single tree splitting structure, a luma block and a chroma block may form one CU, and the luma block and the chroma block may be split into the same splitting structure according to splitting of the CU. In this case, when the luma block is split, the chroma block may also be split using the same method as the method of splitting the luma block. In this case, whether to split the CU may be determined based on the size of the luma block, and the size of the chroma block corresponding thereto may be determined according to the size of the luma block based on a color format.

FIG. 14 is a view illustrating an embodiment of a luma block and a chroma block when a color format is 4:2:0. When the size of the luma block is 16×8, the size of the chroma block may be determined to be 8×4. When an 8×4 chroma block is split into vertical ternary trees, a chroma block having a size of 2×4 is generated. Therefore, splitting of a luma block having a size of 16×8 may be prohibited.

Even when additional splitting of the chroma block is not allowed as in the example of FIG. 14, additional splitting of the luma block may be allowed. Furthermore, even when splitting of the chroma block is not available, in order to increase encoding rate, it may be necessary to perform additional splitting of the splittable luma block. In this case, the luma block and the chroma block which have been split into the single tree splitting structures may be additionally split into dual tree structures. For example, the single tree splitting structure may be dualized into a dual tree splitting structure for the luma block and a dual tree splitting structure for the chroma block. In such dual tree splitting structures, splitting of the luma block and splitting of the chroma block may be independently performed. Therefore, splitting of the luma block may be additionally performed and splitting of the chroma block may not be allowed.

As such, an embodiment of syntax for changing the single tree splitting structure to the dual tree splitting structure is shown in FIGS. 15 to 17. FIGS. 15 to 17 are views illustrating one syntax for a coding tree unit (CTU) according to an embodiment, which are divided into the three drawings due to limitation of the drawing. The syntax of FIGS. 15 to 17 forms continuous syntax. According to the syntax of FIGS. 15 to 17, a decoding apparatus according to an embodiment may determine the modeType of a CTU to be a predetermined prediction mode type based on a value of a modeTypeCondition parameter. Here, modeTypeCondition may be information specifying the prediction mode characteristics of CUs belonging to the CTU. Determination of modeTypeCondition will be described later. modeType may specify an available prediction mode of the CUs belonging to the CTU determined according to modeTypeCondition. In an embodiment, modeType may have a value of any one of MODE_TYPE_ALL specifying that all prediction modes such as intra prediction, IBC prediction, palette mode and inter prediction are available, MODE_TYPE_INTRA specifying that only intra, IBC and palette modes are available, and MPDE_TYPE_INTER specifying that only an inter prediction mode is available.

For example, when modeTypeCondition is a second value (e.g., 1) (1520), the decoding apparatus may determine modeType to be an intra prediction mode type (MODE_TYPE_INTRA) (1530).

Meanwhile, when modeTypeCondition is a third value (e.g., 2) (1540), the decoding apparatus may determine modeType according to a value of mode_constraint_flag. mode_constraint_flag may be obtained from a bitstream (1550). mode_constraint_flag may be a parameter specifying whether a CU in the CTU is encoded only in an inter prediction mode. For example, the first value (e.g., 0) of mode_constraint_flag may specify that the CU in the CTU is encoded only in an inter prediction mode. The second value (e.g., 1) of mode_constraint_flag may specify that the CU in the CTU cannot be encoded in an inter prediction mode. In an embodiment, when mode_constraint_flag has a second value (e.g., 1), the CU in the CTU may be encoded in an intra prediction mode or an IBC prediction mode.

In the embodiment of FIG. 15, when the value of mode_constraint_flag is a first value (e.g., 0), modeType may be determined to be an inter prediction mode type (e.g., MODE_TYPE_INTER), and, when the value of mode_constraint_flag is a second value (e.g., 1), modeType may be determined to be an intra prediction mode type (e.g., MODE_TYPE_INTRA) (1560).

Meanwhile, when modeTypeCondition is a first value (e.g., 0), the decoding apparatus may determine modeType to be a value of modeTypeCurr. For example, modeTypeCurr is a CTU call input value and, when a current CTU is a root CTU, the value of modeTypeCurr may be set to MODE_TYPE_ALL. When the current CTU is split from an upper-layer CTU, modeTypeCurr may be set to the modeType value of the upper-layer CTU.

Next, the decoding apparatus may determine the splitting structure of a lower-layer CTU split from the current CUT according to modeType. For example, when modeType is MODE_TYPE_INTRA, the splitting structure of the lower-layer CTU may be determined to be dual tree luma (DUAL_TREE_LUMA). Meanwhile, when modeType is not MODE_TYPE_INTRA, the splitting structure of the lower-layer CTU may be determined to be the splitting structure of the current CTU (1580).

The splitting structure of the lower-layer CTU determined as described above may be stored in a parameter treeType. In addition, when splitting of the lower-layer CTU is performed as shown in 1610 of FIG. 16, it may be used as an input value specifying the splitting structure of the lower-layer CTU. Therefore, when modeType is MODE_TYPE_INTRA, the lower-layer CTU may be split into dual tree structures. In addition, the above-described modeType may be used as an input value specifying the prediction mode type of the lower-layer CTU.

More specifically, when the prediction mode type (e.g., modeType) of blocks belonging to the lower-layer CTU is MODE_TYPE_INTRA, the lower-layer CTU called by the syntax of FIG. 16 and the syntax of 1710 of FIG. 17 may have a dual tree splitting structure for a luma block. In addition, the splitting type (modeTypeCurr) of the current CTU is MODE_TYPE_ALL and the prediction mode type (modeType) of the lower-layer CTU is MODE_TYPE_INTRA, the lower-layer CTU called by the syntax of 1730 of FIG. 17 may have a dual tree splitting structure for a chroma block (DUAL_TREE_CHROMA). When the prediction mode type of the current CTU is MODE_TYPE_ALL or the prediction mode type of the lower-layer CTU is MODE_TYPE_INTRA (1720), a CTU having a dual tree splitting structure for a chroma block may be generated (1730).

In the above description, modeTypeCondition may be determined as follows. In an embodiment, when any one of the following conditions is true, the modeTypeCondition may be determined to be a first value (e.g., 0).

(Condition 4-1) a slice to which the current CTU belongs is an I slice and a CTU belonging to the corresponding slice is quad-tree-split into 64×64 luma sample CUs (Condition 4-2) modeTypeCurr is not MODE_TYPE_ALL Otherwise, when any one of the following conditions is true, the value of modeTypeCondition may be determined to be a second value (e.g., 1).

(Condition 5-1) the product of the width of the luma block belonging to the current CTU and the height of the luma block is 64 and quad tree splitting is performed on the current CTU (Condition 5-2) the product of the width of the luma block belonging to the current CTU and the height of the luma block is 64 and ternary vertical splitting or ternary horizontal splitting is performed on the current block (Condition 5-3) the product of the width of the luma block belonging to the current CTU and the height of the luma block is 32 and binary vertical splitting or binary horizontal splitting is performed on the current block Meanwhile, when all the above conditions are not satisfied and any one of the following conditions is true, the value of modeTypeCondition may be determined to be a second value (e.g., 1) or a third value (e.g., 2). Whether the value of modeTypeCondition is a second value (e.g., 1) or a third value (e.g., 2) may be determined depending on whether a slice to which the current CTU belongs is an I slice, and, more specifically, the value of modeTypeCondition may be determined to be 1+(slice_type !=I? 1:0). Here, slice_type specifies the type of the slice to which the current CTU belongs, and may have a value of I when the current slice is an I slice and have a value other than I when the current slice is not an I slice.

(Condition 6-1) the product of the width of the luma block belonging to the current CTU and the height of the luma block is 64 and binary horizontal splitting or binary vertical splitting is performed on the current block (Condition 6-2) the product of the width of the luma block belonging to the current CTU and the height of the luma block is 128 and ternary vertical splitting or ternary horizontal splitting is performed on the current block Meanwhile, when all the above conditions are not satisfied, the modeTypeCondition may be set to a first value (e.g., 0).

First Modified Embodiment

Although the size of the luma block is the same, as the color format is different, the size of the chroma block corresponding thereto may be different. Therefore, even when the luma block has a size of 16×8, splitting of the chroma block may be allowed.

For example, FIG. 18 is a view illustrating a luma block and a chroma block when a color format is 4:4:4. When the size of luma block is 16×8, the size of the chroma block may be determined to be 16×8. Therefore, when the color format is 4:4:4, splitting of the luma block having the size of 16×8 may be allowed.

However, in the above embodiment, since the value of modeTypeCondition is determined according to the size of the luma block, even when the chroma block may be additionally splittable according to the color format, splitting into single tree splitting structure is no longer allowed. As such, in order to determine whether to split the chroma block according to the color format, modeTypeCondition may be determined as follows.

In an embodiment, when any one of the following conditions is true, the value of modeTypeCondition may be determined to a first value (e.g., 0).

(Condition 7-1) The slice to which the current CTU belongs is an I slice and the CTU belonging to the corresponding slice is quad-tree-split into 64×64 luma sample CUs (Condition 7-2) modeTypeCurr is not MODE_TYPE_ALL Otherwise, when any one of the following conditions is true, the value of modeTypeCondition may be determined to be a second value (e.g., 1).

(Condition 8-1) the product of the chroma sample number unit width of a chroma block belonging to the current CTU and the chroma sample number unit height is 16 and quad tree splitting is performed on the current block (Condition 8-2) the product of the chroma sample number unit width of the chroma block belonging to the current CTU and the chroma sample number unit height is 16 and ternary vertical splitting or ternary horizontal splitting is performed on the current block Here, the product of the chroma sample number unit width of the chroma block and the chroma sample number unit height may be calculated by (cbWidth/subWidthC)*(cbHeight/subHeightC). Here, cbWidth may be the luma sample unit width of the luma block belonging to the current CTU, cbHeight may be the luma sample unit height of the luma block belonging to the current CTU, and subWidthC and subHeightC may be the width ratio and height ratio of the luma block and the chroma block based on the color format shown in FIG. 10.

Meanwhile, when all the above conditions are not satisfied and any one of the following conditions is true, the value of modeTypeCondition may be determined to be a second value (e.g., 1) or a third value (e.g., 2). Whether the value of modeTypeCondition is a second value (e.g., 1) or a third value (e.g., 2) may be determined according to the slice to which the current CTU belongs is an I slice as described above, and, more specifically, the value of modeTypeCondition may be determined to be 1+(slice_type !=I? 1:0).

(Condition 9-1) the product of the chroma sample number unit width of the chroma block belonging to the current CTU and the chroma sample number unit height is 16 and binary horizontal splitting or binary vertical splitting is performed on the current block For example, according to Condition 1, when the product of the width of the luma block belonging to the current CTU and the height of the luma block is 64 and binary horizontal splitting or binary vertical splitting is performed on the current block, if the color format is 4:2:0, Condition 1 above may be satisfied. However, when the color format is a monochrome format, a 4:2:2 format or a 4:4:4 format, Condition 1 above may not be satisfied.

(Condition 9-2) the product of the chroma sample number unit width of the chroma block belonging to the current CTU and the chroma sample number unit height is 32 and ternary vertical splitting or ternary horizontal splitting is performed on the current block For example, according to Condition 2, when the product of the width of the luma block belonging to the current CTU and the height of the luma block is 128 and ternary horizontal splitting or ternary vertical splitting is performed on the current block, if the color format is 4:2:0, condition 2 above may be satisfied. However, when the color format is a monochrome format, a 4:2:2 format or a 4:4:4 format, Condition 2 above may not be satisfied.

Meanwhile, when all the above conditions are satisfied, the value of modeTypeCondition may be set to a first value (e.g., 0).

Second Modified Embodiment

When the color format of a current picture is a monochrome format or a 4:4:4 color format and is independently encoded for each color plane (e.g., separate color plane), the luma block and the chroma block cannot be simultaneously present in one CTU. Therefore, it is impossible to perform splitting constraint of the chroma block for limiting generation of 2×2, 2×4 or 4×2 chroma sample unit size block of a chroma block based on the sample unit size of the luma block. Therefore, in this case, the method of deriving modeTypeCondition described above may be changed as follows.

In an embodiment, when any one of the following conditions is true, the value of modeTypeCondition may be determined to be a first value (e.g., 0).

(Condition 10-1) the slice to which the current CTU belongs is an I slice and the CTU belonging to the corresponding slice is quad-tree-split into 64×64 luma sample CUs (Condition 10-2) modeTypeCurr is not MODE_TYPE_ALL (Condition 10-3) the color format of an image to which the current CTU belongs is 4:4:4 (e.g., the value of chroma_format_idc is a fourth value (e.g., 3))

Alternatively, Condition 10-3 is applicable when the color format of the image to which the current CTU belongs is 4:4:4 and each color plane is independently encoded/decoded (e.g., the value of separate_colour_plane_flag specifying this is 1).

(Condition 10-4) The color format of the image to which the current CTU belongs is a monochrome format (e.g., the value of chroma_format_idc is a first value (e.g., 0))

Otherwise, when any one of the following conditions is true, the value of modeTypeCondition may be determined to a second value (e.g., 1).

(Condition 11-1) the product of the width of the luma block belonging to the current CTU and the height of the luma block is 64 and quad tree splitting is performed on the current CTU (Condition 11-2) the product of the width of the luma block belonging to the current CTU and the height of the luma block is 64 and ternary vertical splitting or ternary horizontal splitting is performed on the current block (Condition 11-3) the product of the width of the luma block belonging to the current CTU and the height of the luma block is 32 and binary vertical splitting or binary horizontal splitting is performed on the current block Meanwhile, when all the above conditions are not satisfied and when any one of the following conditions is true, the value of modeTypeCondition may be determined to be a second value (e.g., 1) or a third value (e.g., 2). Whether the value of modeTypeCondition is a second value (e.g., 1) or a third value (e.g., 2) may be determined depending on whether the slice to which the current CTU belongs is an I slice, and, more specifically, the value of modeTypeCondition may be determined to be 1+(slice_type !=I? 1:0). Here, slice_type specifies the type of the slice to which the current CTU belongs, and may have a value of I when the current slice is an I slice and have a value other than I when the current slice is not an I slice.

(Condition 12-1) the product of the width of the luma block belonging to the current CTU and the height of the luma block is 64 and binary horizontal splitting or binary vertical splitting is performed on the current block (Condition 12-2) the product of the width of the luma block belonging to the current CTU and the height of the luma block is 128 and ternary vertical splitting or ternary horizontal splitting is performed on the current block Meanwhile, when all the above conditions are not satisfied, the value of modeTypeCondition may be set to a first value (e.g., 0).

Encoding Method

Figure 19:
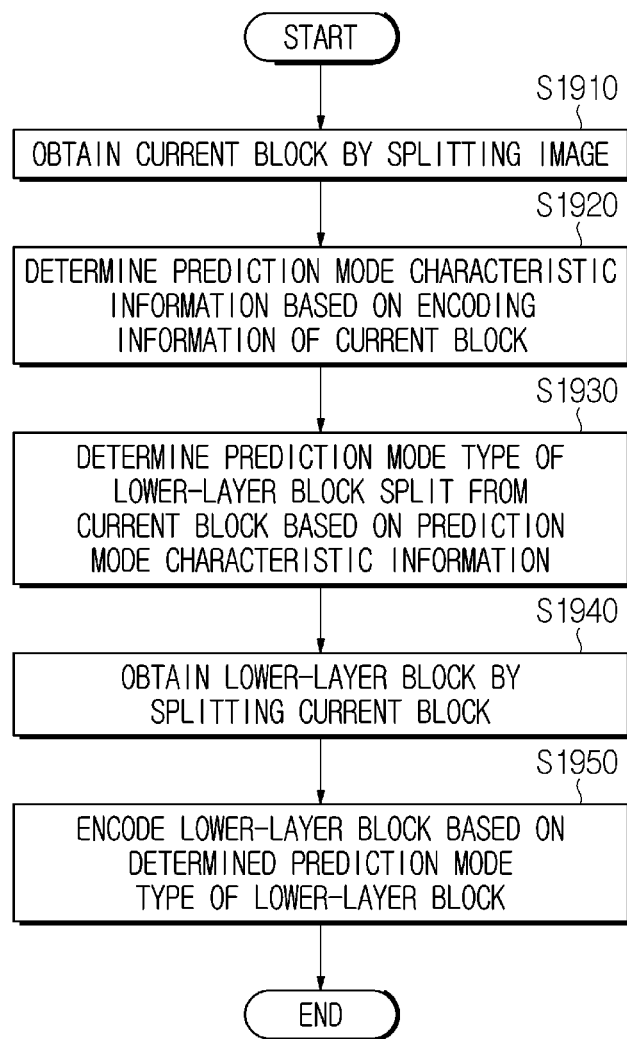
FIGS. 19 to 20 are flowcharts illustrating method of performing encoding and decoding according to an embodiment by an encoding apparatus and a decoding apparatus according to an embodiment.

Hereinafter, a method of performing encoding by an encoding apparatus using the above-described method will be described with reference to FIG. 19. The encoding apparatus according to an embodiment may include a memory and at least one processor, and the following method may be performed by the at least one processor.

First, the encoding apparatus may obtain a current block by splitting an image (S1910). Next, the encoding apparatus may determine prediction mode characteristic information (e.g., modeTypeCondition) based on encoding information of the current block (S1920). Here, the prediction mode characteristic information may be determined based on a color format of the current block. For example, when the color format of the current block is determined to be a monochrome format or a 4:4:4 format, the prediction mode characteristic information may be determined to be a first value (e.g., 0).

Alternatively, when the number of luma samples of the current block is 64, the splitting mode of the current block is a binary splitting mode and the color format of the current block is a predetermined format, the prediction mode characteristic information may be determined to be a first value (e.g., 0). In this case, the predetermined format may be a monochrome format or a 4:4:4 format.

Alternatively, when the number of luma samples of the current block is 128, the splitting mode of the current block is a ternary splitting mode and the color format of the current block is a predetermined format, the prediction mode characteristic information may be determined to a first value (e.g., 0). In this case, the predetermined format may be a monochrome format or a 4:4:4 format.

Meanwhile, when the color format of the current block is a 4:2:0, the number of luma samples of the current block is 64 and the splitting mode of the current block is a binary splitting mode, the prediction mode characteristic information may be determined based on whether the slice to which the current block belongs is an I slice. Alternatively, when the color format of the current block is a 4:2:0 format, the number of luma samples of the current block is 128 and the splitting mode of the current block is a ternary splitting mode, the prediction mode characteristic information may be determined based on whether the slice to which the current block belongs is an I slice.

For example, when the slice to which the current block belongs is an I slice, the prediction mode characteristic information may be determined to be a second value (e.g., 1). Meanwhile, when the slice to which the current block belongs is not an I slice, the prediction mode characteristic information may be determined to be a third value (e.g., 2).

Next, the encoding apparatus may determine a prediction mode type (e.g. modeType) of a lower-layer block split from the current block based on the prediction mode characteristic information (S1930).

As described above, when the prediction mode characteristic information is determined to be a first value (e.g., 0), the prediction mode type of the lower-layer block may be determined to be the same prediction mode type such as the prediction mode type of the current block.

For example, when the prediction mode type of the current block is MODE_TYPE_ALL specifying all prediction modes such as intra prediction, IBC prediction, palette mode and inter prediction are available, the prediction mode type of the lower-layer block may also be determined to be MODE_TYPE_ALL. Therefore, the prediction mode of the lower-layer block may be determined to be any one of an intra prediction mode, an IBC prediction mode, a palette mode and an inter prediction mode as encoding is performed.

In addition, when the prediction mode characteristic information is a second value (e.g., 1), the prediction mode type of the lower-layer block may be determined to be an intra prediction mode type (e.g., MODE_TYPE_INTRA) in which only an intra prediction mode is available as a prediction mode.

In addition, when the prediction mode characteristic information is a third value (e.g., 2), the prediction mode type of the lower-layer block may be determined to be any one of an inter prediction mode type (e.g., MODE_TYPE_INTER) in which only an inter prediction mode is available as the prediction mode or an intra prediction mode type (e.g., MODE_TYPE_INTRA) in which only an intra prediction mode is available.

Next, the encoding apparatus may obtain a lower-layer block by splitting the current block (S1940). For example, the encoding apparatus may split the current block to obtain the lower-layer block by determining the splitting structure of the lower-layer block based on the prediction mode type of the lower-layer block. For example, the encoding apparatus may determine the splitting structure of the lower-layer block to be a dual tree splitting structure, when the prediction mode type of the lower-layer block is an intra prediction mode type. Meanwhile, when the prediction mode of the lower-layer block is not an intra prediction mode type, the encoding apparatus may determine the splitting structure of the lower-layer block to be the same splitting structure as the splitting structure of the current block. For example, when the splitting structure of the current block is a single tree splitting structure, the splitting structure of the lower-layer block may be determined to be a single tree splitting structure, and, when the splitting structure of the current block is a dual tree splitting structure, the splitting structure of the lower-layer block may be determined to be a dual tree splitting structure.

When the splitting structure of the lower-layer block is determined to be a dual tree splitting structure, splitting availability of the luma block and the chroma block for the current block may be independently determined. For example, splitting availability of the luma block may be determined based on the size of the luma block. In addition, splitting availability of the chroma block may be determined based on the size of the chroma block. In an embodiment, splitting availability of the chroma block may be determined based on the color format. More specifically, as described above with reference to FIG. 10, in order to determine the size of the chroma block, the size of the luma block corresponding to the chroma block and the color format of the chroma block may be used.

Next, the encoding apparatus may encode the lower-layer block based on the determined prediction mode type of the lower-layer block (S1950). For example, the encoding apparatus may encode the current block by encoding the lower-layer block based on the prediction mode type of the lower-layer block according to any one of intra, inter, IBC and palette modes. For example, when the prediction mode type of the lower-layer block is MODE_TYPE_ALL, the encoding apparatus may determine the prediction mode of the lower-layer block to be any one of intra, inter, IBC and palette modes. In addition, by encoding a pred_mode_flag parameter specifying the prediction mode of the lower-layer block, the prediction information of the lower-layer block may be encoded.

Meanwhile, when the prediction mode characteristic information calculated above for the current block is a third value (e.g., 2), mode constraint information (e.g. mode_constraint_flag) specifying the prediction mode of the lower-layer block may be encoded. The mode constraint information may specify whether the inter prediction mode applies to the lower-layer block. In an embodiment, when the lower-layer block is encoded in the inter prediction mode, the mode constraint information may be encoded into a first value (e.g., 0) specifying that the inter prediction mode is used. In addition, in an embodiment, when the prediction mode characteristic information calculated above is a third value (e.g., 2) and the lower-layer block is not encoded in the inter prediction mode, the intra prediction mode may be forcibly used as the prediction mode used to encode the lower-layer block. In this case, in order to signal that the lower-layer block has been encoded in the intra prediction mode instead of the inter prediction mode, the mode constraint information may be encoded into a second value (e.g., 1) specifying that the intra prediction mode has been used instead of the inter prediction mode.

Decoding Method

Figure 20:
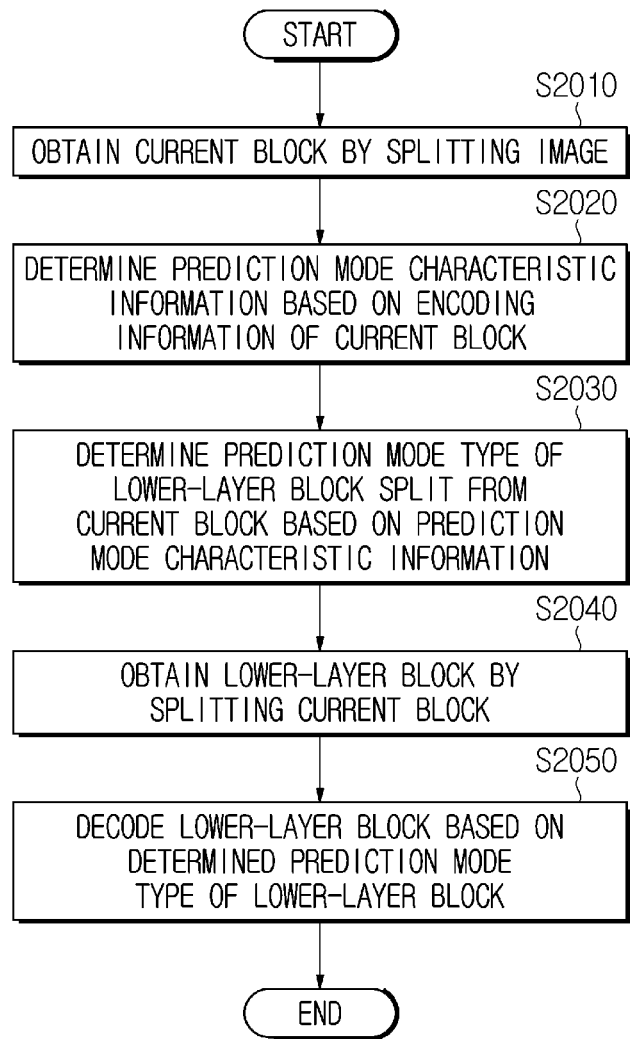

Hereinafter, a method of performing decoding by a decoding apparatus using the above-described method will be described with reference to FIG. 20. The decoding apparatus according to an embodiment may include a memory and at least one processor, and the following method may be performed by the at least one processor.

First, the decoding apparatus may obtain a current block by splitting an image (S2010). Next, the decoding apparatus may determine the prediction mode characteristic information (e.g., modeTypeCondition) based on encoding information of the current block (S2020). Here, the prediction mode characteristic information may be determined based on the color format of the current block. For example, when the color format of the current block is a monochrome format or a 4:4:4 format, the prediction mode characteristic information may be determined to be a first value (e.g., 0).

Alternatively, when the number of luma samples of the current block is 64, the splitting mode of the current block is a binary splitting mode and the color format of the current block is a predetermined format, the prediction mode characteristic information may be determined to be a first value (e.g., 0). In this case, the predetermined format may be a monochrome format or a 4:4:4 format.

Alternatively, when the number of luma samples of the current block is 128, the splitting mode of the current block is a ternary splitting mode and the color format of the current block is a predetermined format, the prediction mode characteristic information may be determined to be a first value (e.g., 0). In this case, the predetermined format may be a monochrome format or a 4:4:4 format.

Meanwhile, when the color format of the current block is a 4:2:0 format, the number of luma samples of the current block is 64 and the splitting mode of the current block is a binary splitting mode, the prediction mode characteristic information may be determined based on whether the slice to which the current block belongs is an I slice. Alternatively, when the color format of the current block is a 4:2:0 format, the number of luma samples of the current block is 128 and the splitting mode of the current block is a ternary splitting mode, the prediction mode characteristic information may be determined based on whether the slice to which the current block belongs is an I slice.

For example, when the slice to which the current block belongs is an I slice, the prediction mode characteristic information may be determined to be a second value (e.g., 1). Meanwhile, when the slice to which the current block belongs is not an I slice, the prediction mode characteristic information may be determined to be a third value (e.g., 2).

Next, the decoding apparatus may determine the prediction mode type of the lower-layer block (e.g., modeType) split from the current block based on the prediction mode characteristic information (S2030).

As described above, when the prediction mode characteristic information is determined to be a first value (e.g., 0), the prediction mode type of the lower-layer block may be determined to be the same prediction mode type as the prediction mode type of the current block. In addition, when the prediction mode characteristic information is a second value (e.g., 1), the prediction mode type of the lower-layer block may be determined to be an intra prediction mode type (e.g., MODE_TYPE_INTRA).

In addition, when the prediction mode characteristic information is a third value (e.g., 2), the prediction mode type of the lower-layer block may be determined based on mode constraint information (e.g., mode_constraint_flag) obtained from a bitstream. Hereinafter, the mode constraint information may specify whether the inter prediction mode is available. In an embodiment, when the mode constraint information specifies that the inter prediction mode is allowed, the prediction mode type of the lower-layer block may be determined to be an inter prediction mode type (e.g., MODE_TYPE_INTER). Meanwhile, when the mode constraint information specifies that the inter prediction mode is not allowed, the prediction mode type of the lower-layer block may be determined to be an intra prediction mode type (e.g., MODE_TYPE_INTRA).

Next, the decoding apparatus may obtain a lower-layer block by splitting the current block (S2040). For example, the decoding apparatus may split the current block to obtain the lower-layer block by determining the splitting structure of the lower-layer block based on the prediction mode type of the lower-layer block. For example, when the prediction mode type of the lower-layer block is an intra prediction mode type, the decoding apparatus may determine the splitting structure of the lower-layer block to be a dual tree splitting structure. Meanwhile, when the prediction mode type of the lower-layer block is not an intra prediction mode type, the decoding apparatus may determine the splitting structure of the lower-layer block to be the same splitting structure as the splitting structure of the current block. For example, when the splitting structure of the current block is a single tree splitting structure, the splitting structure of the lower-layer block may be determined to be a single tree splitting structure, and, when the splitting structure of the current block is a dual tree splitting structure, the splitting structure of the lower-layer block may be determined to be a dual tree splitting structure.

When the splitting structure of the lower-layer block is determined to be a dual tree splitting structure, splitting availability of the luma block and the chroma block for the current block may be independently determined. For example, splitting availability of the luma block may be determined based on the size of the luma block. In addition, splitting availability of the chroma block may be determined based on the size of the chroma block. In an embodiment, splitting availability of the chroma block may be determined based on the color format. More specifically, as described above with reference to FIG. 10, in order to determine the size of the chroma block, the size of the luma block corresponding to the chroma block and the color format of the chroma block may be used.

Next, the decoding apparatus may decode the lower-layer block based on the determined prediction mode type of the lower-layer block (S2050). For example, the decoding apparatus may determine the prediction mode of the lower-layer block to be any one of intra, inter, IBC and palette modes based on the prediction mode information obtained from a bitstream according to the prediction mode type of the lower-layer block, and decode the lower-layer block based on the determined prediction mode to decode the current block. For example, only when the prediction mode type of the lower-layer block is MODE_TYPE_ALL, the decoding apparatus may obtain a pred_mode_flag parameter specifying the prediction mode of the lower-layer block. In addition, the lower-layer block may be predicted according to a prediction mode (e.g., an inter prediction mode or an intra prediction mode) specified by pred_mode_flag.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 21:
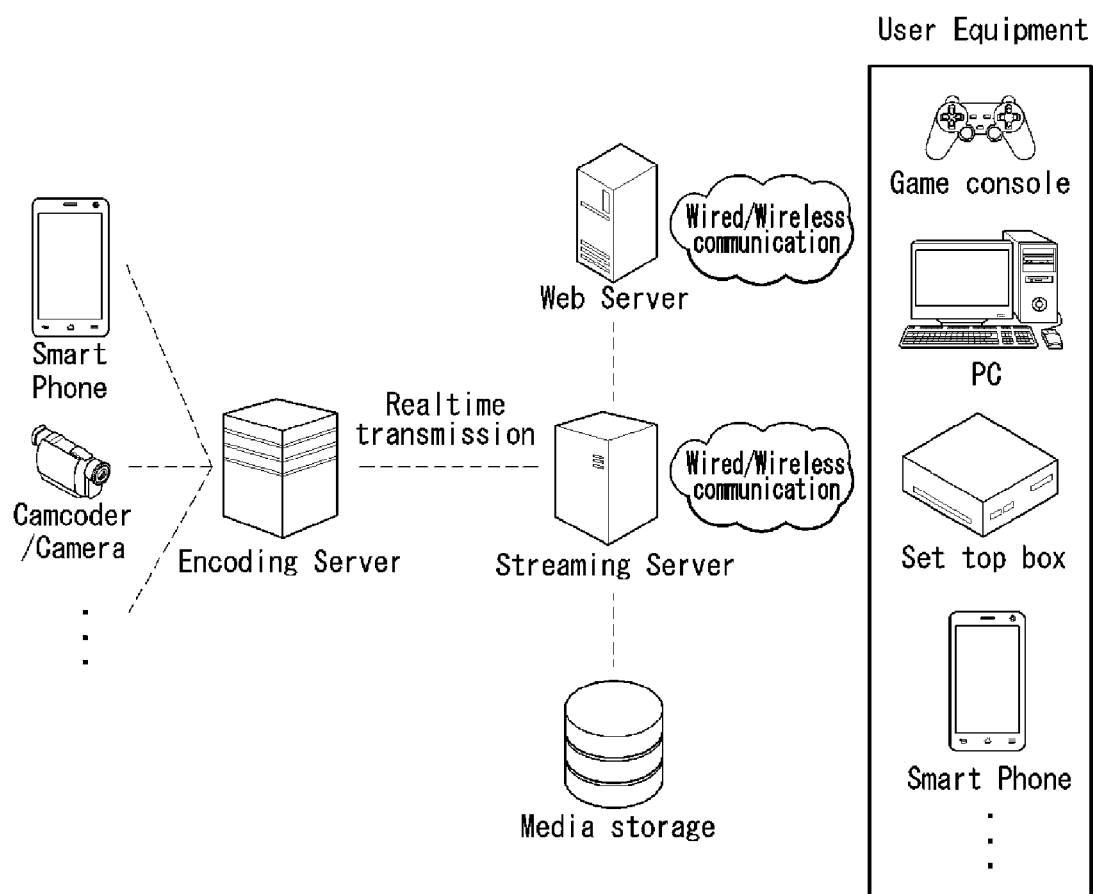
FIG. 21 is a view showing a content streaming system, to which an embodiment of the present disclosure is applicable.

FIG. 21 is a view showing a contents streaming system, to which an embodiment of the present disclosure is applicable.

As shown in FIG. 21, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    determining prediction mode characteristic information of a first block;
    determining a prediction mode type of a second block included in the first block based on the determined prediction mode characteristic information; and
    decoding the second block based on the determined prediction mode type,
    wherein the prediction mode characteristic information is determined based on a color format of the first block.

2. The image decoding method of claim 1,
    wherein the second block is obtained by splitting the first block based on a predetermined splitting structure.

3. The image decoding method of claim 2,
    wherein the splitting structure is determined to be a dual tree structure, based on the prediction mode type of the second block being an intra prediction mode type.

4. The image decoding method of claim 1,
    wherein the prediction mode characteristic information is determined to be a first value, based on the color format of the first block being a monochrome format or a 4:4:4 format.

5. The image decoding method of claim 1,
    wherein, based on a number of luma samples of the first block being 64 and a splitting mode of the first block being a binary splitting mode and the color format of the first block being a predetermined format, the prediction mode characteristic information is determined to be a first value.

6. The image decoding method of claim 1,
    wherein, based on a number of luma samples of the first block being 128 and a splitting mode of the first block being a ternary splitting mode and the color format of the first block being a predetermined format, the prediction mode characteristic information is determined to be a first value.

7. The image decoding method of claim 1,
    wherein the prediction mode characteristic information is determined further based on whether a slice to which the first block belongs is an I slice.

8. The image decoding method of claim 1,
    wherein, based on a number of luma samples of the first block being 64 and a splitting mode of the first block being a binary splitting mode and the color format of the first block being a 4:2:0 format, the prediction mode characteristic information is determined to be a second value or a third value based on whether a slice to which the current block belongs is an I slice.

9. The image decoding method of claim 1,
    wherein, based on a number of luma samples of the first block being 128 and a splitting mode of the first block being a ternary splitting mode and the color format of the first block being a 4:2:0 format, the prediction mode characteristic information is determined to be a second value or a third value based on whether a slice to which the current block belongs is an I slice.

10. An image encoding method performed by an image encoding apparatus, the image encoding method comprising:
    determining prediction mode characteristic information of a first block;
    determining a prediction mode type of a second block included in the first block based on the determined prediction mode characteristic information; and
    encoding the second block based on the determined prediction mode type,
    wherein the prediction mode characteristic information is determined based on a color format of the first block.

11. The image encoding method of claim 10,
    wherein, based on a number of luma samples of the first block being 64 and a splitting mode of the first block being a binary splitting mode and the color format of the first block being a predetermined format, the prediction mode characteristic information is determined to be a first value.

12. The image encoding method of claim 10,
    wherein, based on a number of luma samples of the first block being 128 and a splitting mode of the first block being a ternary splitting mode and the color format of the first block being a predetermined format, the prediction mode characteristic information is determined to be a first value.

13. The image encoding method of claim 10,
    wherein the prediction mode characteristic information is determined further based on whether a slice to which the first block belongs is an I slice.

14. A method of transmitting a bitstream generated by an image encoding method, the image encoding method comprising:
    determining prediction mode characteristic information of a first block;
    determining a prediction mode type of a second block included in the first block, based on the determined prediction mode characteristic information; and
    encoding the second block based on the determined prediction mode type, wherein the prediction mode characteristic information is determined based on a color format of the first block.

* * * * *